(12) United States Patent
Shan et al.

(10) Patent No.: US 8,713,443 B2
(45) Date of Patent: Apr. 29, 2014

(54) ACTIVE AND PROGRESSIVE TARGETED ADVERTISING

(75) Inventors: Ying Shan, Sammaish, WA (US); Ying Li, Belleview, WA (US)

(73) Assignee: Microsoft Corporation, Redmond, WA (US)

( * ) Notice: Subject to any disclaimer, the term of this patent is extended or adjusted under 35 U.S.C. 154(b) by 1067 days.

(21) Appl. No.: 12/178,956

(22) Filed: Jul. 24, 2008

(65) Prior Publication Data

US 2010/0023893 A1    Jan. 28, 2010

(51) Int. Cl.
*G06F 3/00* (2006.01)
*G06F 3/048* (2013.01)
*G06F 17/30* (2006.01)

(52) U.S. Cl.
CPC ................................ *G06F 17/30873* (2013.01)
USPC ........... 715/738; 715/761; 715/762; 715/763; 715/760; 715/838

(58) Field of Classification Search
USPC .............. 705/14, 26; 715/761, 762, 763, 760, 715/838, 835
See application file for complete search history.

(56) References Cited

U.S. PATENT DOCUMENTS

| | | | |
|---|---|---|---|
| 6,119,098 A | 9/2000 | Guyot | |
| 6,738,078 B1 | 5/2004 | Duncombe | |
| 7,062,510 B1 | 6/2006 | Eldering | |
| 7,194,424 B2 | 3/2007 | Greer | |
| 7,337,127 B1 * | 2/2008 | Smith et al. ................ | 705/14.66 |
| 7,954,056 B2 * | 5/2011 | Graham ........................ | 715/716 |
| 8,032,556 B1 * | 10/2011 | Cook et al. .................... | 707/783 |
| 8,484,563 B2 * | 7/2013 | Alhadeff et al. .............. | 715/719 |
| 8,549,163 B2 * | 10/2013 | Urdan et al. ................. | 709/231 |
| 2002/0112233 A1 * | 8/2002 | Cantu Bonilla et al. ........ | 725/23 |
| 2003/0009762 A1 | 1/2003 | Hooper | |
| 2003/0078854 A1 | 4/2003 | Shim | |
| 2003/0154126 A1 | 8/2003 | Gehlot | |
| 2003/0184598 A1 * | 10/2003 | Graham ........................ | 345/838 |

(Continued)

FOREIGN PATENT DOCUMENTS

| | | |
|---|---|---|
| WO | WO0124062 A1 | 4/2001 |
| WO | WO2007038761 A2 | 4/2007 |

OTHER PUBLICATIONS

About Vesalilus; http://www.vesalius.com/about.asp, Publishing date 2008, Publisher: Versalius.

(Continued)

*Primary Examiner* — David Phantana Angkool
(74) *Attorney, Agent, or Firm* — Doug Barker; Joann Dewey; Micky Minhas

(57) ABSTRACT

Methods and computer-readable media for presenting a user with advertising content, such as an advertisement or coupon, based on the user's responses to one or more questions are provided. A user may view a web page that includes one or more thumbnails, where each thumbnail represents a media, such as a video clip, an audio clip, or an image. Once a user selects a thumbnail, by hovering a cursor over the thumbnail, for example, a question may appear over the thumbnail. The user may respond to the question, and based on the response, may be provided with some form of relevant advertising content. Subsequent questions may be presented to the user if the user selects more than one thumbnail in a session, and thus the user may be provided with highly relevant advertising content that is based on responses to more than one question.

20 Claims, 7 Drawing Sheets

(56) References Cited

U.S. PATENT DOCUMENTS

2004/0163101 A1    8/2004  Swix
2007/0233375 A1*  10/2007  Garg et al. ............... 701/211
2008/0199042 A1*   8/2008  Smith ........................ 382/100
2010/0023893 A1*   1/2010  Shan et al. ................ 715/838
2010/0199190 A1*   8/2010  Cadiz et al. .............. 715/736

OTHER PUBLICATIONS

Download Accelerator Plus Delivers 1 Billionth File; http://www.speedbit.com/press/pressfebruary13.asp, Publishing date Feb. 13, 2001, Publisher: SpeedBit Ltd.

* cited by examiner

ACTIVE AND PROGRESSIVE TARGETED ADVERTISING

BACKGROUND

Targeted advertising, such as behavioral advertising, is typically based on information collected from an individual's web-browsing behavior, such as web pages visited and searches that have been made. This type of targeted advertising may require an understanding of the content that a user is currently experiencing on the Internet, whether it is a video or audio clip, an image, or the like. While this method may provide some information about a user's interests, it does not allow for the selected advertisements to be directly relevant to the user. Another form of targeted advertising, contextual advertising, may provide advertisements to a user based on keywords found in the content of which the user is currently viewing. As with behavioral advertising, contextual advertising requires knowledge and understanding of content that the user is currently viewing, or that the user has viewed in the past, such as a search history. Understanding of content can be not only time-consuming, but costly as well, and may not provide the most relevant advertisements or other content to users.

SUMMARY

Embodiments of the present invention relate to methods and computer-readable media for displaying advertising content to a user based on responses received to one or more questions provided to a user. The questions may be provided to a user upon the user selecting a thumbnail and may be displayed on at least a portion of the selected thumbnail. There may be one or more thumbnails displayed, and each thumbnail may represent an associated video clip, an audio clip, an image, or the like. Upon answering the question, advertising content based on the response to the question is displayed and may be displayed along with the associated video clip, audio clip, image, or the like. Other embodiments of the present invention relate to receiving responses to questions from previous users in relation to a particular selected thumbnail and generating statistical information to provide advertising content to subsequent users who have selected the same thumbnail.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention are described in detail below with reference to the attached drawing figures, wherein.

DETAILED DESCRIPTION

Figure 1:
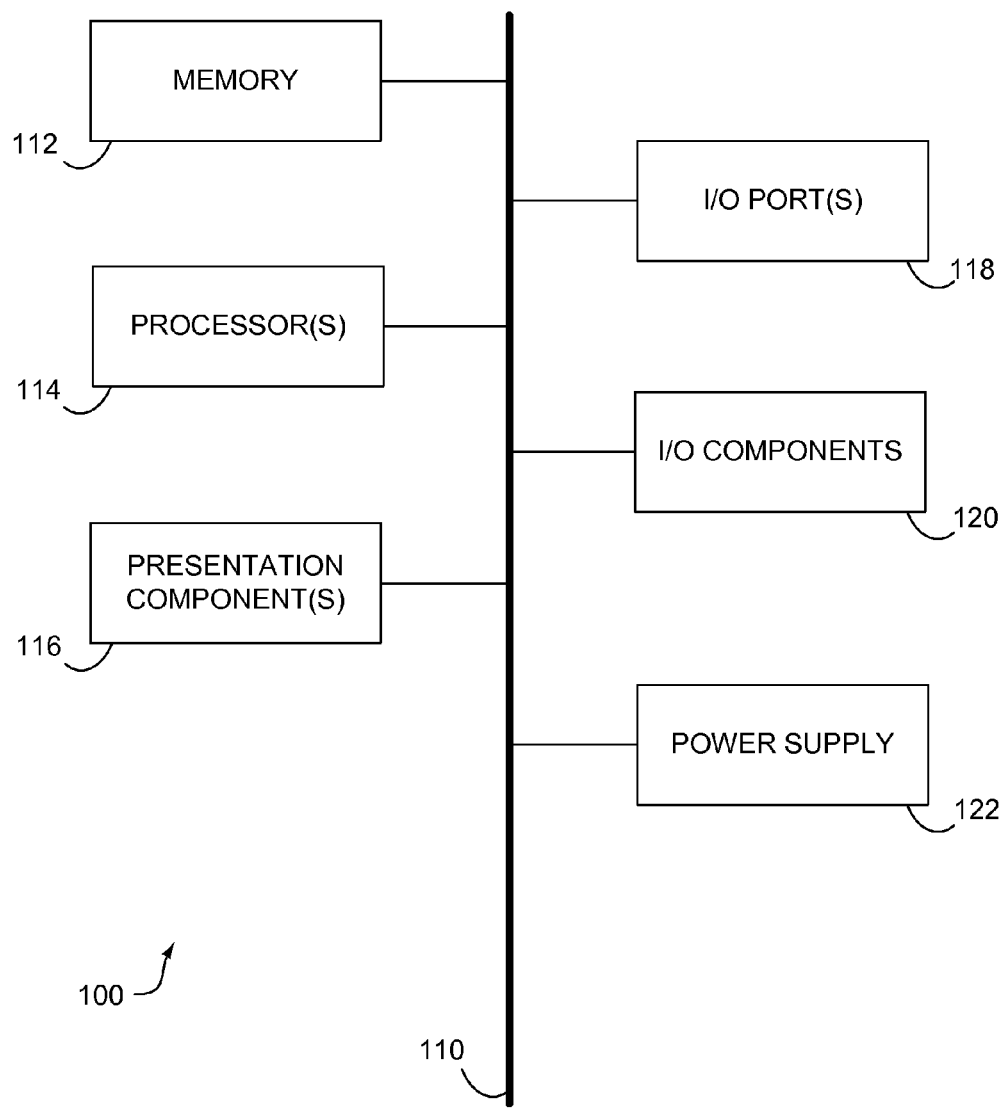
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods and computer-readable media for displaying advertising content to a user based on user responses to one or more questions. Questions may be provided to a user upon the user selecting a thumbnail, wherein the selection may be a cursor hovering over the thumbnail. The question may be displayed over the thumbnail, and once the question has been answered, advertising content is selected based on the user's answer. The user may select more than one thumbnail in a session. A different question may be displayed each time a different thumbnail is selected, thus selecting relevant advertising content based on responses to more than one question. Other embodiments of the present invention relate to displaying advertising content to a user based on responses to questions from previous users, wherein the questions were provided to the previous users upon the previous users' selection of the same thumbnail that the current user selected.

In one aspect, a computer-implemented method for displaying advertising content on a display based on responses to one or more questions provided to a user is provided. The method includes displaying at least one thumbnail, wherein the at least one thumbnail is associated with one or more of a video clip, an audio clip, or an image, and receiving a first user selection of a first of the at least one thumbnail. In response to the first user selection, the method includes providing the user with a first question, receiving a response from the user to the first question, and based on the response to the first question, displaying advertising content.

In another aspect, a computer-implemented method for presenting advertising content to a user based on information received from previous users is provided. The method includes displaying at least one thumbnail, wherein the at least one thumbnail is associated with one or more of a video clip, an audio clip, or an image, receiving a user selection from the user of one of the at least one thumbnail, and accessing a data store to determine statistical information associated with the one of the at least one thumbnail. The statistical information is generated from responses to questions from previous users, the questions being provided to the previous users in response to the user selection of the one of the at least one thumbnail. Further, the method provides displaying advertising content based on the statistical information.

In yet another aspect, one or more computer-readable media having computer-useable instructions embodied thereon for performing a method of displaying advertising content on a display based on responses to one or more questions provided to a user is provided. The method includes displaying at least one thumbnail, wherein the at least one thumbnail is associated with one or more of a video clip, an audio clip, or an image, receiving a first user selection of a first of the at least one thumbnail, and activating the first of the at least one thumbnail in response to the first user selection, wherein activating the first thumbnail includes providing the user with a first question. The method further includes receiving a response from the user to the first question, and based on that response, determining one or more advertising contents to be displayed to the user. In addition, the method includes displaying a larger view of the first of the at least one thumbnail, and displaying the one or more advertising contents, wherein the one or more advertising contents are displayed on at least a portion of the larger view.

Having briefly described an overview of exemplary embodiments of the present invention, an exemplary operating environment for the present invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computer 100 typically includes a variety of computer-readable media. Computer-readable media can be any available media that can be accessed by computer 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display, speaker, printing component, vibrating component, etc.

I/O ports 118 allow computing device 100 to be logically coupled to other devices, including I/O components 120, some of which may be built in. Illustrative components include a microphone, joystick, game pad, satellite dish, scanner, printer, wireless device, etc.

Figure 2:
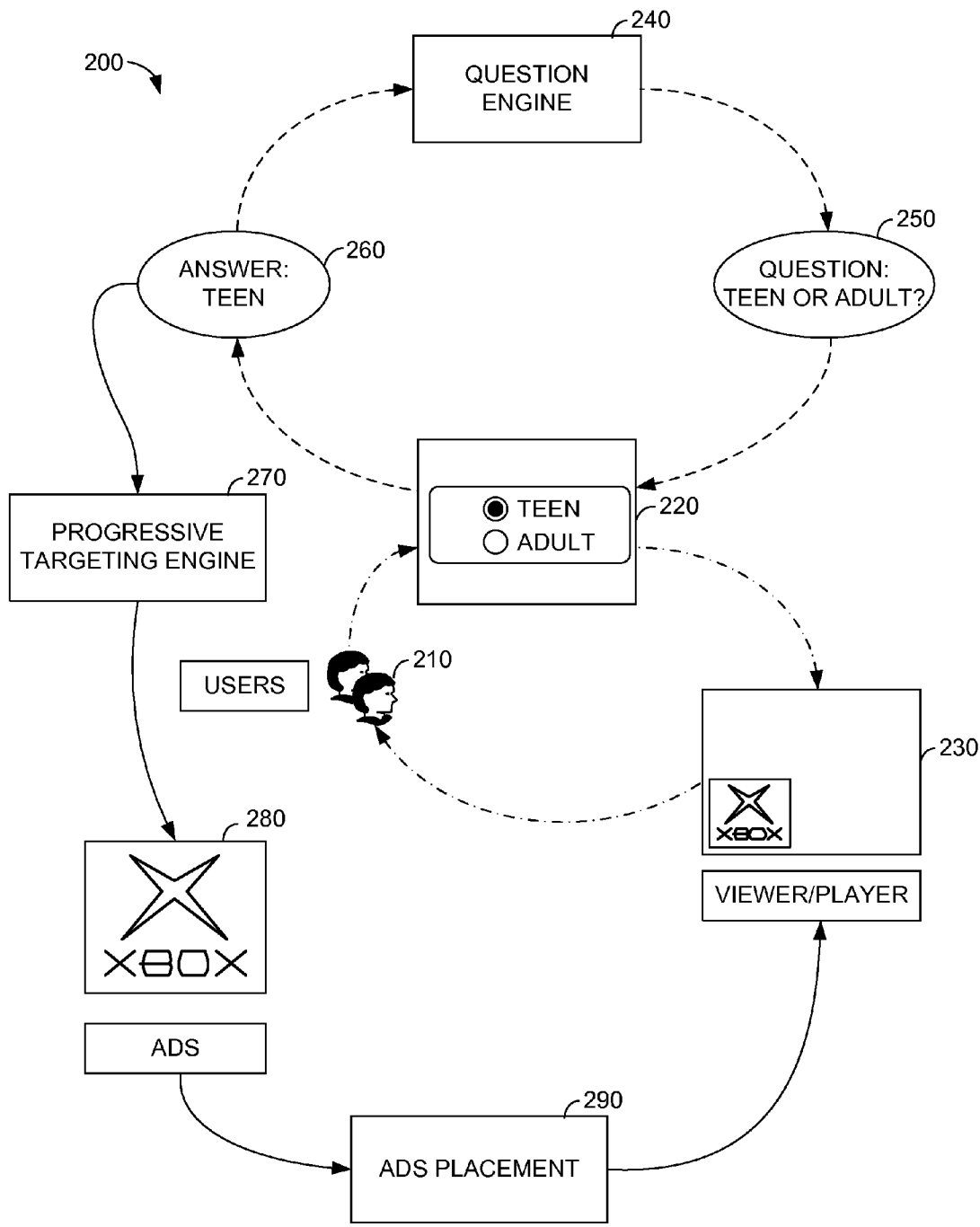
FIG. 2 is a block diagram of an exemplary system architecture for determining a question to provide to a user, determining the advertising content to display to a user, and displaying the advertising content to the user, in accordance with an embodiment of the present invention.

Referring now to FIG. 2, a block diagram of an exemplary system architecture 200 is illustrated for determining a question to provide to a user, determining the advertising content to display to a user, and displaying the advertising content to the user, in accordance with an embodiment of the present invention. FIG. 2 illustrates three interconnected processes, which include a browsing process, an active questioning process, and a progressive targeting process. While these three processes are shown, it will be understood by one of ordinary skill in the art that more or less steps may be taken to accomplish the same result, and are contemplated to be within the scope of the present invention.

The browsing process comprises a user selection of a thumbnail 210, a user's response to the question 220, and a viewer or player 230, and is represented in FIG. 2 by the dashed and dotted lines. Item 210 represents a user browsing through one or more web pages, for example, in search of some type of media, audio, image, or the like. For example, a user may wish to view a video that can be found on a particular web page, or may wish to listen to a song. Alternatively, a user may want to view a certain image. Each of these may be represented by a thumbnail. In one instance, an Internet search program may be used (e.g., Microsoft® Live Search of WINDOWS LIVE, a network of Internet services of Microsoft Corporation of Redmond, Wash.) to search for videos, audio, images, or the like. One or more thumbnails that represent videos, audio, images, or the like may be displayed. At this point, the thumbnails are inactive. In some instances, the user may be able to select one of the displayed thumbnails to view the information associated with the thumbnail, such as a video, audio, image, or the like. Users may select a thumbnail in a number of ways, such as, but not limited to, hovering a mouse cursor over the thumbnail, clicking on the thumbnail, or using a function such as control-alt-delete.

Once a thumbnail is selected, a question may be presented to the user, and the thumbnail then becomes active. The question may be displayed on a portion of the thumbnail, or may be displayed on another part of the display. The question may be any type of question, such as, but not limited to, a question that provides the user with more than one answer choice, a question that requires a user to input one or more words into an answer box, etc. The question may also be of any complexity. For instance, the question may be very simple, such as, but not limited to, a user's gender, an age range, a marital status, a number of children that the user has, interests of the user, a certain product of interest to the user, or the like. The user may respond to the question, as shown at item 220, and the thumbnail is now in a selected state. Once the user responds to the question, a viewer or player may initiate, if required. For instance, if the thumbnail is associated with an audio or video clip or any other type of media, a media player may start up and play the associated audio or video clip, as shown at item 230. The clip may be displayed in a larger view or form than the thumbnail for easier viewing by the user. Similarly, if the thumbnail is associated with an image, an image may appear on the display in a larger view than the thumbnail. In addition to a larger view, advertising content may also be displayed to the user. Advertising content may be an advertisement, coupon, or any other information that can be presented to a user based on the user's response to the question.

While the embodiment of FIG. 2 illustrates one question, more than one question may be provided to a user. For instance, in one session, a user may select more than one thumbnail in order to view the associated content, such as, but not limited to, a video or audio clip, or an image. Each subsequent thumbnail selection may provide the user with a different question, and advertising content may be selected according to some or all of the user's responses to the previous questions.

The questioning process comprises a user's response to a question 220, as previously discussed, and the following additional items: question engine 240, a question 250, and an answer to the question 260, and is represented by the dashed lines in FIG. 2. A question engine 240 generates the questions that are provided to a user and may be responsible for presenting a set of new questions to the user each time a new thumbnail is selected. Questions may be produced to maximize targeting accuracy while minimizing overhead expenses. As such, in some instances, simple questions may be provided to users. As discussed above, questions may be of any type, and may be simple in nature, so to be quickly and accurately derived for targeting to provide the best advertising content to users (e.g., nonintrusive, concise, simple, limited in number (e.g., one question provided for each selected thumbnail), informative, and relevant). Once a question is generated, it is presented to a user who has selected a thumbnail (e.g., by hovering a mouse cursor over the thumbnail, clicking on the thumbnail, or using a function such as control-alt-delete). A question is illustrated at item 250. Here, the question is whether the user is a teen or adult, which will allow for advertising content to be more relevant to the user than if the age range or age classification of that user was unknown. At item 220, as previously discussed, the user may select an answer to the question, and as shown here, the question requires very little time and effort on the user's part. Once answered, the response is received, as shown at item 260.

As discussed above, if a user selects multiple thumbnails in a single session, question engine 240 may keep track of which questions have already been asked, and generates a different question for each selected thumbnail. By asking different questions, the system is able to better choose relevant advertising content for a particular user. Further, question engine 240 may choose subsequent questions to provide to a user based on a user's response to one or more of the previous questions.

The progressive targeting process is illustrated by the solid lines, and comprises progressive targeting engine 270, the selected advertising content 280, advertisement placement engine 290, and a viewer or player 230, as previously discussed. Once a user responds to a question, the response is processed by progressive targeting engine 270. Progressive targeting engine 270 may have one or more inputs, which may comprise question-answer pairs that have been accumulated thus far from a user (e.g., in a single session). The output of progressive targeting engine 270 may be advertising content that is most relevant to this particular user, given the question-answer pairs. Progressive targeting engine 270 may select advertising content based on keywords, or alternatively, may select them based on demographics and/or psychographics categories when the questions are related to such categories. Furthermore, active learning may be used to determine the most relevant ads for a particular user based on that user's recent responses to multiple previous questions and responses, even questions and responses from sessions other than the current session. In some instances, this information may be cached and used at a later time.

At item 280, advertising content is selected. It is then determined where the advertising content will be placed on the display by advertisement placement engine 290. In one embodiment, the advertising content is an image, and may be displayed on a different portion of the display than the thumbnail, which is typically larger in size than the thumbnail, as illustrated at item 230. In another embodiment, the advertising content is a media clip (e.g., commercial) and may also be displayed on at least a portion of a viewer or player. In yet another embodiment, the advertising content is displayed on a portion of the display other than the viewer or player. Further, the advertising content may be displayed to a user before, during, or after the media (e.g., video clip, audio clip, or image) associated with the thumbnail is displayed.

Figure 3:
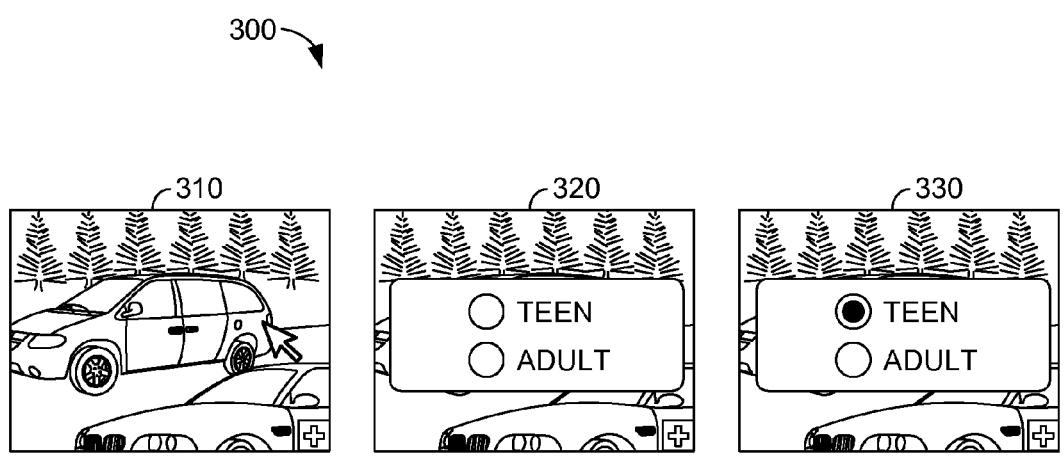
FIG. 3 is an illustrative screen display of an exemplary thumbnail showing the thumbnail in three different states, in accordance with an embodiment of the present invention.

FIG. 3 is an illustrative screen display of an exemplary thumbnail showing the thumbnail in three different states 300, in accordance with an embodiment of the present invention. Item 310 represents a thumbnail in a first state, which is an inactive state, or mode. The thumbnail remains in an inactive state until a user selects the thumbnail (e.g., by hovering a mouse cursor over the thumbnail, clicking on the thumbnail, or using a function such as control-alt-delete). Once selected, the thumbnail becomes active, as illustrated at item 320. The thumbnail is in an active state or active mode because a user may interact with the thumbnail by responding to the question provided. Here, the question is displayed on a portion of the thumbnail, but in another embodiment, it may be displayed on another part of the display. Item 330 illustrates the user's response to the question provided. The thumbnail is now in a selected state or mode, and the viewer or player, if required, may be triggered or initiated.

Figure 4:
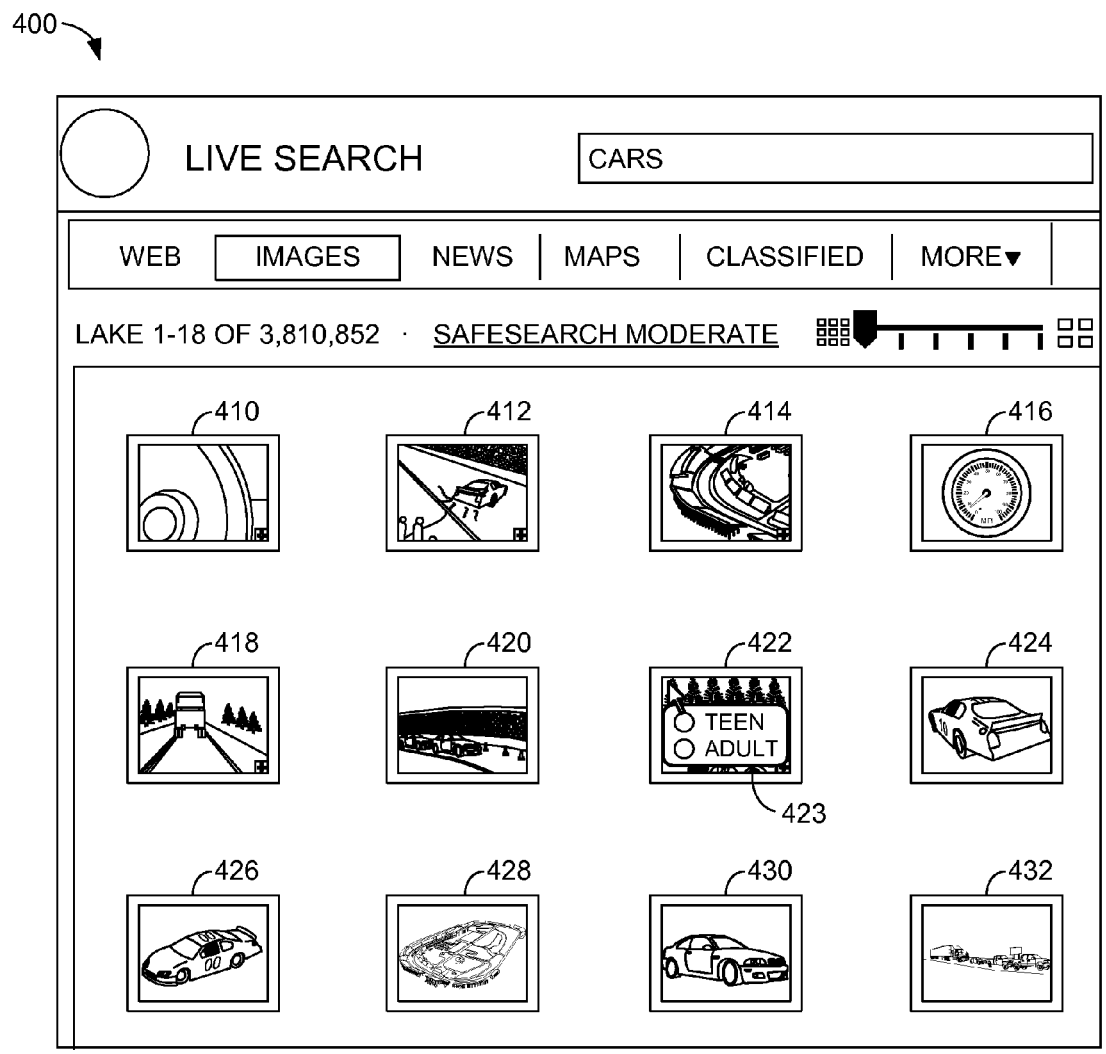
FIG. 4 is an illustrative screen display of an exemplary user interface showing a plurality of thumbnails, wherein one of the thumbnails has been selected by a user, in accordance with an embodiment of the present invention.

Turning now to FIG. 4, an illustrative screen display of an exemplary user interface 400 is shown having a plurality of thumbnails, wherein one of the thumbnails has been selected by a user, in accordance with an embodiment of the present invention. Exemplary user interface 400 contains a plurality of thumbnails that may have been presented to a user in response to the user's search or query, which here, was "cars." These thumbnails are represented by items 410, 412, 414, 416, 418, 420, 422, 424, 426, 428, 430 and 432. A question is provided within a box 423 on thumbnail 422, which has been selected by the user, in accordance with an embodiment of the present invention.

Figure 5:
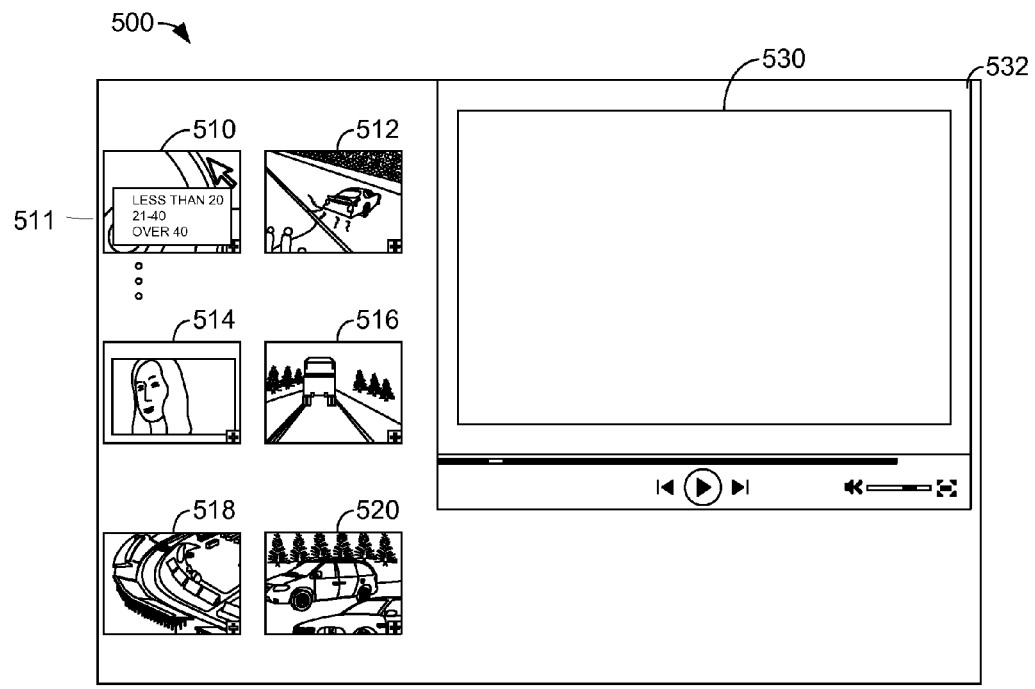
FIG. 5 is an illustrative screen display of an exemplary user interface showing a question on the thumbnail selected by the user, in accordance with an embodiment of the present invention.

Referring now to FIG. 5, an illustrative screen display of an exemplary user interface 500 is shown. Exemplary user interface 500 contains a plurality of thumbnails that may have been presented to a user in response to the user's search or query. These thumbnails are represented by items 510, 512, 514, 516, 518, and 520. A question is provided within a box 511 on thumbnail 510, which has been selected by the user. The thumbnail becomes activated, and is now in an active state. As the thumbnail is active, the user may select an answer to the question in box 511. As shown, box 530 is much larger than the size of thumbnail 510, which allows for easier viewing by the user. Here, thumbnail 510 represents a video or a video clip. Once the user responds to the question, the video clip may be played by a video player 532 inside box 530, or any other type of media player. FIG. 5 shows an empty box 530, as the user has not yet responded to the question, and therefore the media player 532 may not have yet initiated.

Figure 6:
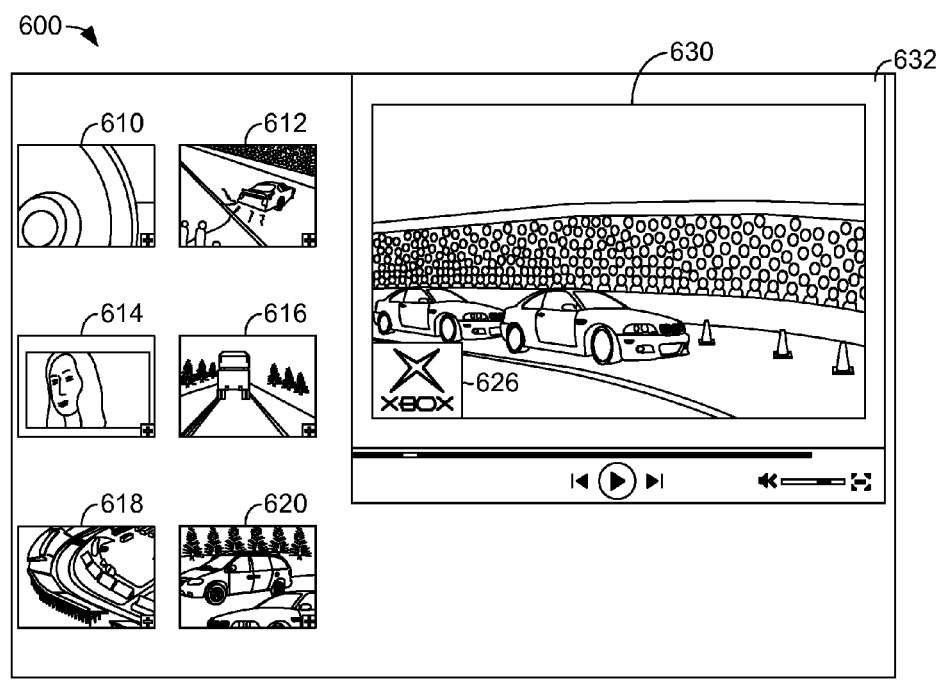
FIG. 6 is an illustrative screen display of an exemplary user interface showing advertising content displayed to a user, in accordance with an embodiment of the present invention.

FIG. 6 is an illustrative screen display of an exemplary user interface 600 showing advertising content displayed to a user, in accordance with an embodiment of the present invention. As FIG. 5 illustrates a question box 511 within the thumbnail, FIG. 6 illustrates what may occur once a user responds to the question provided. Thumbnails include 610, 612, 614, 616, 618, and 620. Thumbnail 610 is the thumbnail that has been selected by the user (corresponds to thumbnail 510 in FIG. 5). Once selected, the video clip associated with thumbnail 610 is displayed in box 630, as video player 632 has been initiated. Advertising content 626 has been selected by, for example, progressive targeting engine 270, and here, is displayed within a portion of box 630. As previously mentioned, advertising content may be of any form, such as audio, video, or an image, and may be displayed on any portion of the display. Also, the advertising content may be displayed or played, depending on the type of content, before, during, or after the video clip or other media is played and displayed.

Figure 7:
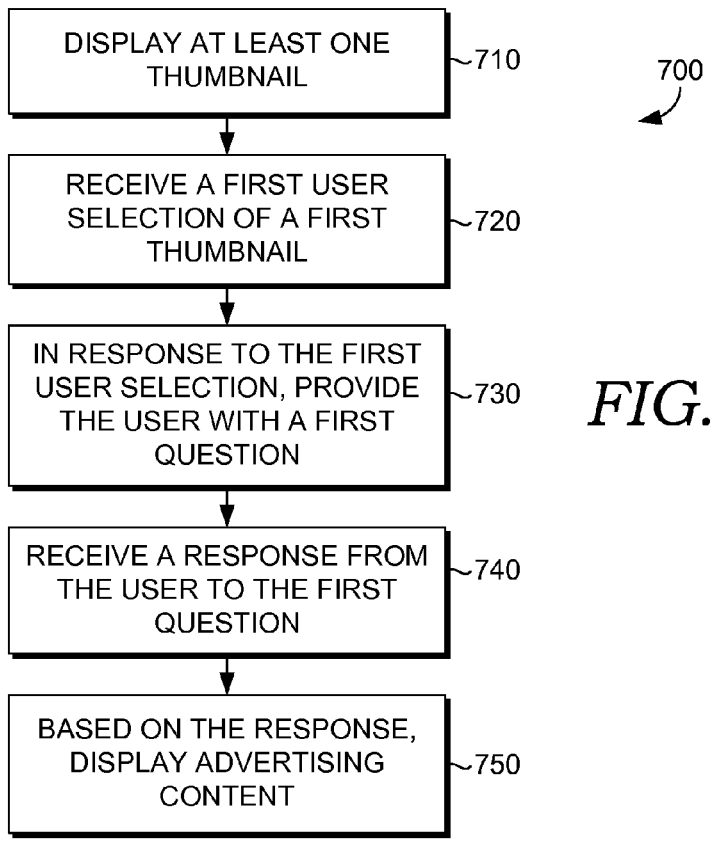
FIG. 7 is a flow diagram of a method for displaying advertising content on a display based on responses to one or more questions provided to a user, in accordance with an embodiment of the present invention.

Turning to FIG. 7, a flow diagram is illustrated of a method 700 for displaying advertising content on a display based on responses to one or more questions provided to a user, in accordance with an embodiment of the present invention. Initially at step 710, at least one thumbnail is displayed. The thumbnail may represent a video clip, an audio clip, an image, or the like. At step 720, a first user selection of one of the displayed thumbnails may be received. As previously mentioned, this selection of a thumbnail may be made by hovering a mouse cursor over the thumbnail, clicking on the thumbnail, using a function such as control-alt-delete, or any other method that would allow for selection of a thumbnail. In response to the user's first selection at step 720, the user is provided with a first question at step 730. The question may be displayed over at least a portion of the selected thumbnail, or may be displayed on another portion of the display. The thumbnail may then become activated, and the user may respond to the first question. The response is received at step 740. Based on the user's response to the first question, advertising content may be displayed at step 750.

As previously described, a larger view of the selected thumbnail may be displayed upon receiving the user's response to the first question. The media associated with the thumbnail (e.g., video clip, audio clip, or image) may be displayed on the larger view. The larger view may also be associated with a video player, audio player, another type of media player, or the like. The larger view may overlap the thumbnail, or may be displayed in a different portion of the display than the selected first thumbnail. Further, advertising content may be displayed on the larger view in one embodiment, but in another embodiment, may be displayed on another portion of the display. The advertising content may be displayed before, simultaneously, or after the display of the associated media (e.g., video clip, audio clip, or image).

With continued reference to FIG. 7, a user may select more than one thumbnail in either a single session or multiple sessions. For example, a user may make a second selection of a second thumbnail. In response to this selection, the user may be provided with a second question, as determined by question engine 240, for example. This question may be different than the first question, and may be selected as a follow-up question to the first question to retrieve more information from the user. Further, the second question may depend on the user's response to the first question. The response from the user may be received for the second question. In one embodiment, advertising content may be selected and displayed based on the response to the second question, but in another embodiment, advertising content may be selected and displayed based on responses to both the first and second question.

Figure 8:
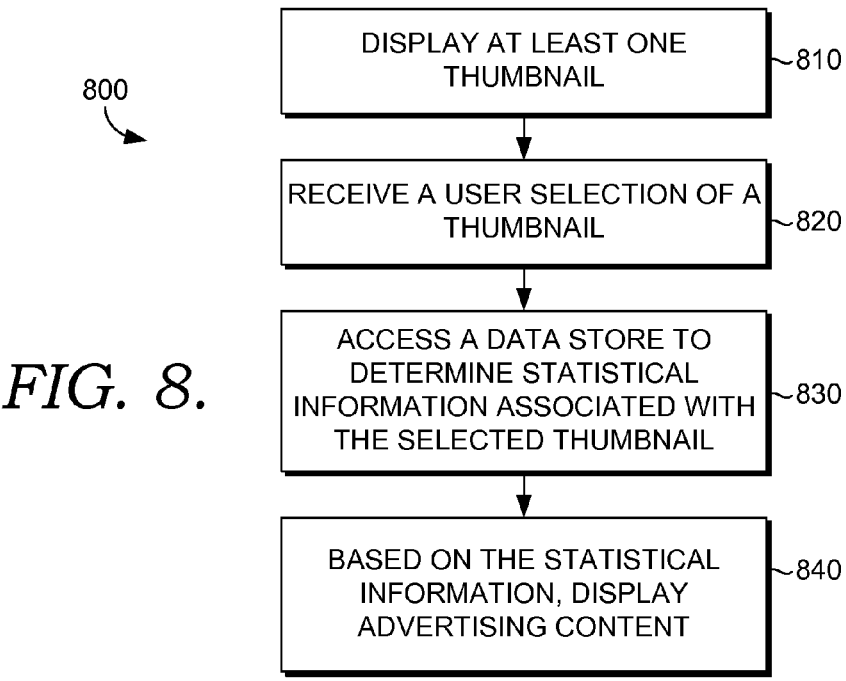
FIG. 8 is a flow diagram of a method for presenting advertising content to a user based on information received from previous users, in accordance with an embodiment of the present invention.

FIG. 8 is a flow diagram of a method 800 for presenting advertising content to a user based on information received from previous users, in accordance with an embodiment of the present invention. At step 810, at least one thumbnail is displayed, and the thumbnail may be associated with one or more of a video clip, an audio clip, image, or the like. A user selection of one of the thumbnails is received at step 820. Next, at step 830, a data store may be accessed to determine or retrieve statistical information associated with the selected thumbnail. The statistical information may be derived from a variety of sources. In one embodiment, the statistical information is generated from previous responses from previous users who selected the same thumbnail as the current user. Thus, the current user may not be presented with a question, but may be presented with advertising content based on the previous responses, as shown at step 840. As the statistical information may be derived from previous users' responses associated with the same thumbnail currently selected, associated content displayed to the current user may be found to be highly relevant to the current user, as the current user may have similar interests and may be demographically similar to previous users of the same media.

In generating the statistical information, a user selection of a particular thumbnail may be received from one or more previous users. These users may be provided with a question in response to the previous users' selection of that particular thumbnail. These previous users may be provided with a series of different questions if they select more than one thumbnail in a single session. In one embodiment, it may be determined that a particular user has been presented with one or more questions in a previous session. If this information is cached, question engine 240, for example, may provide the user with different questions than what he or she had been provided with in a previous session, thus collecting more valuable information about that user. In some instances, just one question is provided for each selected thumbnail. Responses may be received from the previous users and, based on these responses, statistical information is generated.

Figure 9:
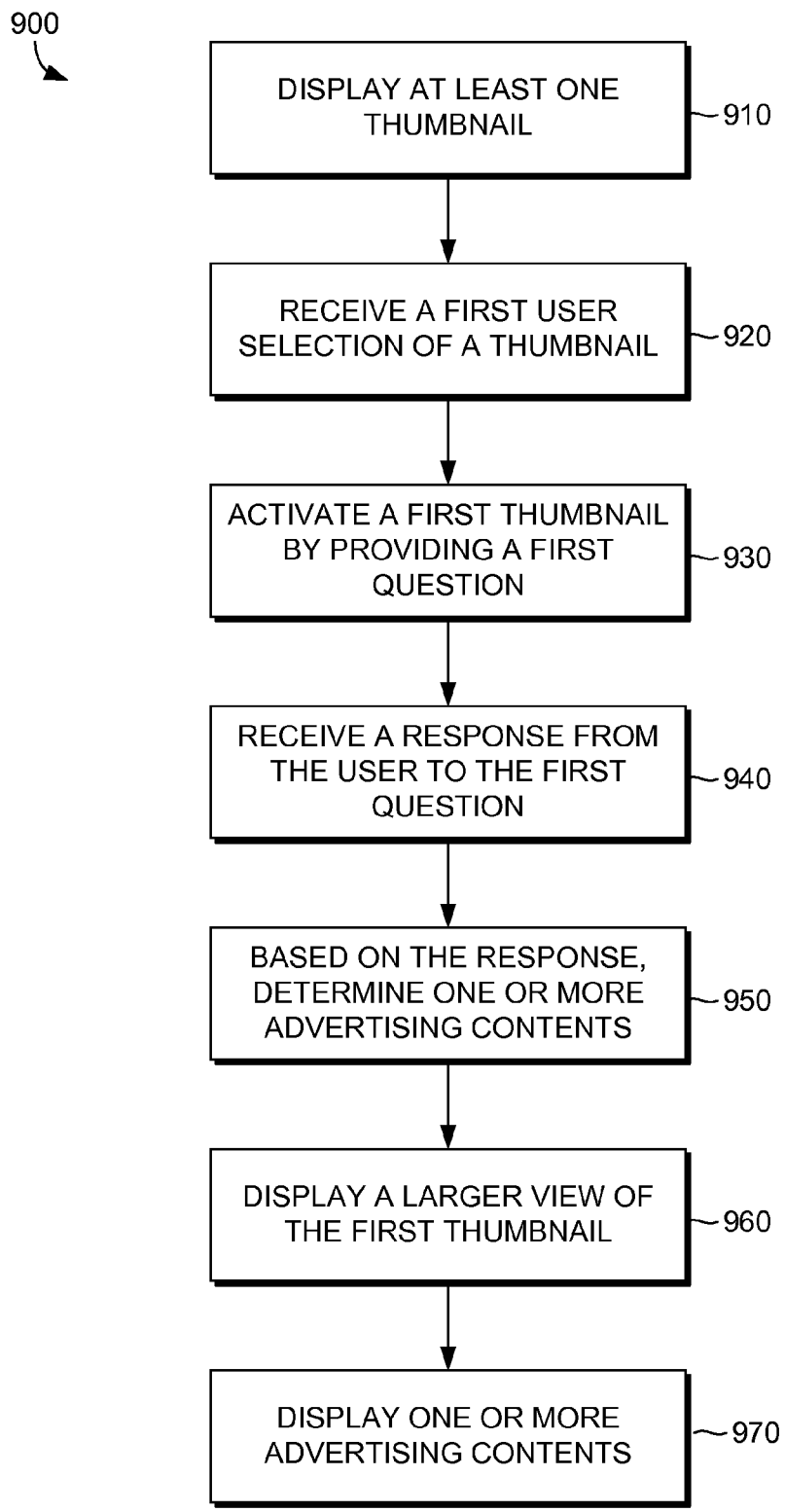
FIG. 9 is a flow diagram of a method for displaying advertising content on a display based on responses to one or more questions provided to a user, in accordance with an embodiment of the present invention.

Referring now to FIG. 9, a flow diagram is shown of a method 900 for displaying advertising content on a display based on responses to one or more questions provided to a user, in accordance with an embodiment of the present invention. Initially, at step 910, at least one thumbnail is displayed. As previously mentioned, the thumbnail may be associated with one or more of a video clip, an audio clip, an image, or the like. At step 920, a first user selection of a thumbnail is received, which in turn activates the selected thumbnail. This is shown at step 930. Activation of the thumbnail may include providing the user with a first question. A response is received to the first question at step 940. Based on this response, one or more advertising contents are determined or selected and are displayed for the user at step 950. A larger view of the associated media may be displayed at step 960, wherein the larger view may display an associated video or audio clip, an image, etc. The larger view may correspond or be a part of a viewer or player, such as a media or audio player. Finally, at step 970, the advertising content or contents may be displayed, and in one embodiment, may be displayed on at least a portion of the larger view.

With continued reference to FIG. 9, a user may select more than one thumbnail in a single session. For instance, a user may select a second thumbnail by making a second user selection. The second thumbnail may become activated after the user selects that thumbnail. A response may be received from the user to the second question and based on that response, another advertising content may be displayed. This advertising content may be based solely on the user's response to the second question, or on the responses to both the first and second questions.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well-adapted to attain all the ends and objects set forth above, together with other advantages which are obvious and inherent to the methods. It will be understood that certain features and subcombinations are of utility and may be employed without reference to other features and subcombinations. This is contemplated by and is within the scope of the claims.

What is claimed is:

1. A computer-implemented method for displaying advertising content on a display based on responses to one or more questions provided to a user, the method comprising:
    displaying at least one thumbnail, wherein the at least one thumbnail is selectable and associated with one or more of a video clip, an audio clip, or an image;
    receiving a first user selection of a first of the at least one thumbnail;
    upon receiving the first user selection of the first of the at least one thumbnail, providing the user with a first question;
    based on receiving the first user selection of the first of the at least one thumbnail, receiving a response from the user to the first question, the response and the first question comprising a first question-answer pair;
    based on the first question-answer pair and the receiving the first user selection of the at least one thumbnail, selecting advertising content to display to provide for targeted advertising to the particular user; and
    displaying the selected advertising content.

2. The method of claim 1, wherein the first user selection is hovering a cursor over the first of the at least one thumbnail.

3. The method of claim 1, wherein the first question is displayed over at least a portion of the first of the at least one thumbnail.

4. The method of claim 1, further comprising:
    upon receiving the response to the first question, displaying a larger view of the one of the at least one thumbnail, wherein the associated one or more of a video clip, an audio clip, or an image are displayed on the larger view.

5. The method of claim 4, wherein the larger view of the first of the at least one thumbnail is displayed in a different portion of the display than the first of the at least one thumbnail.

6. The method of claim 5, wherein the advertising content is displayed on at least a portion of the larger view of the first of the at least one thumbnail.

7. The method of claim 1, wherein the advertising content is simultaneously presented with the associated one or more of a video clip, an audio clip, or an image.

8. The method of claim 1, further comprising:
    receiving a second user selection of a second of the at least one thumbnail;
    in response to the second user selection, providing the user with a second question;
    receiving the response from the user to the second question, the response and the second question comprising a second question-answer pair; and
    based on the second question-answer pair, displaying the advertising content.

9. The method of claim 8, wherein the advertising content is based on the first question-answer pair and the second question-answer pair.

10. A computer-implemented method for presenting advertising content to a user based on information received from previous users, the method comprising:
    displaying at least one thumbnail, wherein the at least one thumbnail is selectable and associated with one or more of a video clip, an audio clip, or an image;
    receiving a user selection from the user of one of the at least one thumbnail;
    upon receiving the user selection of the one of the at least one thumbnail, accessing a data store to generate statistical information associated with the one of the at least one thumbnail, wherein the statistical information is generated from responses to questions that indicate one or more preferences or traits of previous users, the questions having been provided to the previous users in response to previous user selections of the one of the at least one thumbnail;
    based on the receiving the user selection from the user of the one of the at least one thumbnail, utilizing the statistical information corresponding to the one of the at least one thumbnail to select targeted advertising content to display; and
    displaying the selected advertising content.

11. The method of claim 10, further comprising:
receiving the user selection from one of the previous users of the one of the at least one thumbnail.

12. The method of claim 11, further comprising:
in response to the user selection, providing the one of the previous users with a question.

13. The method of claim 12, further comprising:
if the one of the previous users selects more than one of the at least one thumbnail in a single session, providing the one of the previous users with a series of questions, wherein one question is provided for each of the at least one thumbnail selected.

14. The method of claim 13, further comprising:
receiving a response from the one of the previous users to each of the different questions.

15. The method of claim 14, further comprising:
based on the response from the one of the previous users and other previous users, generating the statistical information.

16. One or more computer storage media having computer-useable instructions embodied thereon that, when executed by a computing system having a processor and a memory, perform a method of displaying advertising content on a display based on responses to one or more questions provided to a user, the method comprising:
displaying at least one thumbnail, wherein the at least one thumbnail is selectable and associated with one or more of a video clip, an audio clip, or an image;
receiving a first user selection of a first of the at least one thumbnail;
activating the first of the at least one thumbnail in response to the first user selection, wherein activating the first of the at least one thumbnail includes providing the user with a first question;
receiving a response from the user to the first question, the response and the first question comprising a first question-answer pair;
utilizing the first question-answer pair to select one or more advertising contents from a plurality of advertising contents to be displayed to the user;
displaying a larger view of the associated one or more of a video clip, an audio clip, or an image; and
based on the receiving the first user selection of the first of the at least one thumbnail, displaying the one or more selected advertising contents, wherein the one or more selected advertising contents are displayed on at least a portion of the larger view.

17. The computer storage media of claim 16, further comprising:
if the one of the at least one thumbnail is associated with the video clip, initiating a video player.

18. The computer storage media of claim 17, further comprising:
if the one of the at least one thumbnail is associated with the audio clip, initiating an audio player.

19. The computer storage media of claim 16, further comprising:
receiving a second user selection of a second of the at least one thumbnail;
activating the second of the at least one thumbnail in response to the second user selection, wherein activating the second of the at least one thumbnail includes providing the user with a second question;
receiving the response from the user to the second question, the response and the second question comprising a second question-answer pair;
based on the second question-answer pair, determining the one or more advertising contents to be displayed to the user; and
displaying the one or more advertising contents.

20. The computer storage media of claim 19, wherein the one or more advertising contents are determined based on the second question-answer pair and the first question-answer pair.

* * * * *